United States Patent [19]
Johanning

[11] 4,396,337
[45] Aug. 2, 1983

[54] GRAIN SILO FOR STORAGE AND MIXING OF LAYERS OF DIFFERENT GRAIN KINDS

[75] Inventor: Hermann Johanning, Melle, Fed. Rep. of Germany

[73] Assignee: Engelbrecht & Lemmerbrock GmbH & Co., Melle, Fed. Rep. of Germany

[21] Appl. No.: 233,826

[22] Filed: Feb. 12, 1981

[30] Foreign Application Priority Data

Feb. 14, 1980 [DE] Fed. Rep. of Germany ....... 3005501

[51] Int. Cl.$^3$ .............................................. B65G 65/48
[52] U.S. Cl. ................................... 414/304; 222/410; 222/564; 414/288
[58] Field of Search .............. 414/288, 304, 306, 309, 414/325; 222/410, 564

[56] References Cited

U.S. PATENT DOCUMENTS

3,289,710 12/1966 Litchard .......................... 222/410 X
3,713,552 1/1973 Schnyder ............................ 414/325

FOREIGN PATENT DOCUMENTS

1550301 11/1968 France ................................. 414/304

*Primary Examiner*—Robert G. Sheridan
*Attorney, Agent, or Firm*—Balogh, Osann, Kramer, Dvorak, Genova & Traub

[57] ABSTRACT

A round silo for storage of different kinds of grain, especially damp grain, in layers one above the other, in a predetermined ratio, so as to facilitate a desired mixture of different grain kinds. The silo is of the type including a central bottom outlet opening. The central bottom outlet opening is in the shape of a conical deflector having a truncated conical surface, with the point thereof upwardly facing, and an outer peripheral edge disposed at a predetermined distance from the bottom of the silo. Furthermore, the silo is provided at its bottom end with an annular zone defined outwardly by the silo wall and inwardly by the outer peripheral edge of the conical deflector. A rotatable blade is mounted at the bottom of the silo beneath the conical deflector for rotation around the central axis of the silo for conveying grain toward the center of the silo and the conveyor means. The free end of the rotatable blade engages a grain slope formed in the annular zone to convey grain to the conveyor means where the grain is mixed with grain of a different kind taken off an upper layer so as to obtain a desired mixture of different grain kinds.

8 Claims, 4 Drawing Figures

GRAIN SILO FOR STORAGE AND MIXING OF LAYERS OF DIFFERENT GRAIN KINDS

BACKGROUND OF THE INVENTION

The present invention relates to round grain silos, especially damp grain, of the kind having a central bottom outlet opening and a mechanical or pneumatic conveyor connected thereto.

In agriculture the ripe grain harvested on a farm is these days often directly used on the farm itself e.g. for fattening pigs. Thus different proportions for mixing types of grain e.g. 25% oats and 75% barley or 50% barley and 50% oats, rye and wheat are seen as especially favorable for a fattening operation. If there are several round silos available, these types of grain which occur one after the other in combine harvesting at harvest time can be stored separately in such silos. The farmer is then in the position to be able to remove the individual types of grain via the central bottom outlets of the silos and then to mix and grind them in the desired proportion. Round silos are generally provided with a central bottom outlet due to the static layout of a round silo. Due to this bottom outlet the grain will trickle downwardly, forming a kind of central shaft over the entire height of the grain in the silo i.e. the grain in the silo will always discharge by trickling downwards from the upper surface of the grain which thus assumes a tubular formation with very thick "walls" of grain.

In small agricultural businesses with a pig fattening section or in smaller pig fatteners it is not possible to incur the extremely high investment for a number of round silos at a cost of several hundred thousand dollars so that these businesses must be satisfied with purchasing a single silo.

It is an object of the invention to provide means whereby a single round silo can be loaded with the types of grain which occur one after the other at harvest time, in a manner of speaking in layers one above the other and to be able to take the various types of grain from such layers, mixed in the desired ratio, from the silo.

SUMMARY OF THE INVENTION

This and other objects are achieved according to the invention which consists in a round grain silo of the kind having a central bottom outlet opening and a mechanical or pneumatic conveyor means connected thereto, wherein a removal device is provided which conveys the grain from an annular zone extending at a distance around said central outlet opening centrally to said conveyor means.

The grain, e.g. oats, is therefore removed from the uppermost layer in the silo through the central bottom outlet opening by reason of the fact that the grain is removed from this topmost layer like a central tube, extending from top to bottom, of trickling grain. It has been found that on removal of grain from the bottom of the silo from a ring surrounding and spaced from the central outlet opening by means of a device removing the grain from the ring, that only grain from the lowest silo layer is removed whereby the surface of this lowest layer remains basically in the same shape.

The arrangement according to the invention thus enables any desired mixing proportion e.g. of oats to grain by appropriate dimensioning or adjustment of the central bottom outlet opening and by a suitable operation of the device for removal of the grain from the ring encircling and spaced from the central outlet opening.

The invention also makes it possible to load a silo with different types of grain in sequence as they ripen and are harvested, even if they have a higher dampness content than is necessary for normal storage. Costs otherwise necessary for drying are thus avoided and investment can thus in practice be amortised.

BRIEF DESCRIPTION OF THE DRAWINGS

In order that the invention may be more clearly understood, reference will now be made to the accompanying drawings which show certain embodiments thereof by way of example and in which.

DETAILED DESCRIPTION OF THE PREFERRED EMBODIMENT

Figure 1:
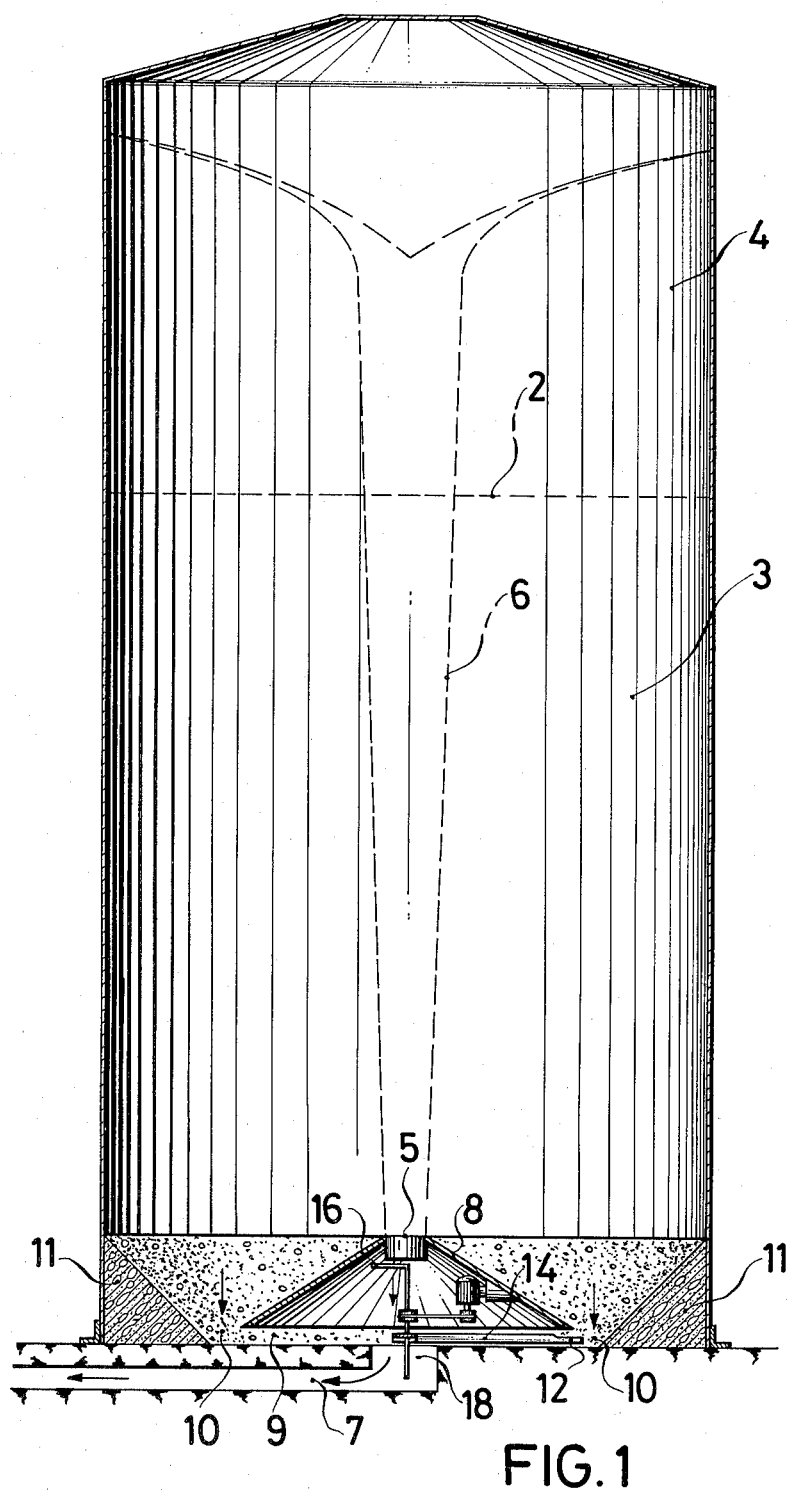
FIG. 1 schematically shows an axial sectional view of a round silo incorporating an embodiment of a device according to the invention.

Referring now to the drawings, the silo schematically depicted is usually air-tight and sealable and is usable particularly for storage of damp grain.

The silo is loaded successively in layers as the various types of grain e.g. barley, oats or barley, rye wheat and oats come to ripeness and are harvested until the silo is filled or partly filled. The silo 1 is thus loaded e.g. below the dashed line 2 with barley and above this line with oats 4 in a ratio of 1 of oats to 3 of barley.

The static stresses of the silo are reduced or removed because a layer can only be removed centrally via an outlet opening 5 and the grain from the upper layer 4 only trickles downwards in the shape of an axial tube 6 as shown in dotted line, as soon as a mechanical or pneumatic conveyor 7 of any desired kind and therefore not shown in detail and which may be loaded by the grain, is set in motion below the outlet opening 5.

The silo 1 loaded in layers with various types of grain one above the other should be so emptied for the fattening of pigs for example that the types of grain are supplied to the lower conveyor 7 mixed in a certain favourable ratio e.g. 25% oats from the top layer 4 and 75% barley from the bottom layer 3. It should be pointed out that a the beginning of the removal, which only occurs centrally, only barley from the lower layer 3 is removed in tube-like manner until approximately 2 to 4% of the grain has run out of the silo. Generally speaking only oats from the upper layer 4 then run in tube-like manner downwards as is shown at 6. As soon as this eventuates, the silo 1 may be emptied e.g. for pig fattening, so that the types of grain are supplied mixed from the layers 4 and 3 to the conveyor 7 underneath e.g. in the ratio 25% oats from layer 4 and 75% barley from layer 3.

Figure 2:
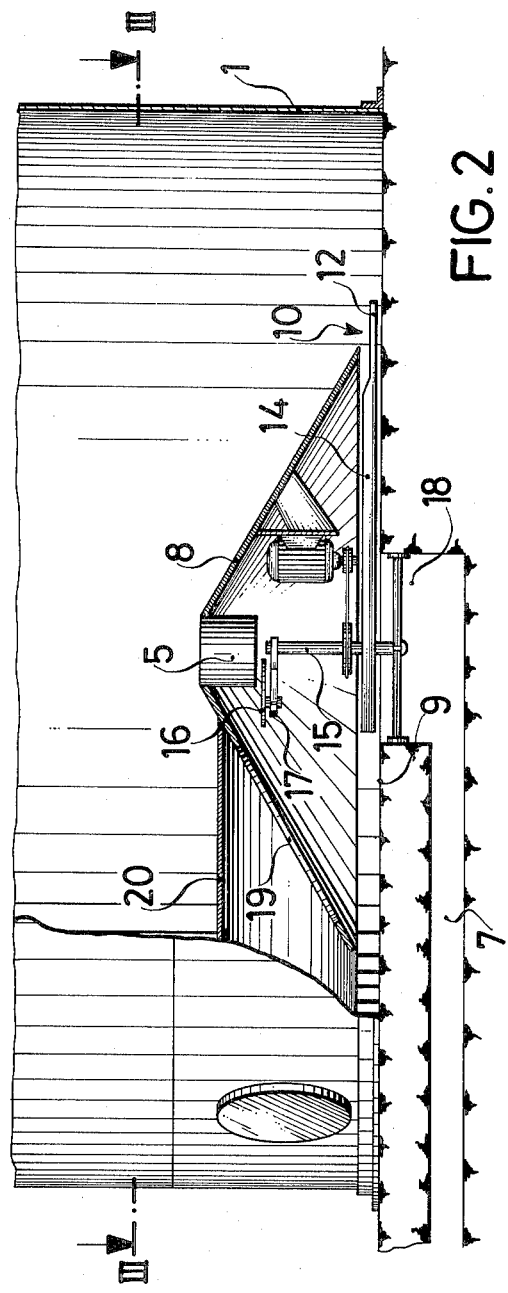
FIG. 2 is an enlarged view of the lower part of the silo of FIG. 1.

For this purpose the central lower outlet opening 5 is advantageously raised above the silo floor or bottom 9 and is shaped as a conical deflector the upper face having a truncated conical face at 8 and the lower outer peripheral edge of which is at a distance from the silo base or bottom 9 and forms the inner delimitation of an annular zone 10 delimited outwardly by the silo wall, as shown in FIG. 2. However, the annular zone 10 is delimited outwardly by an inclined concrete filler 11 as is shown in FIG. 1. This annular zone 10 is partly covered at the periphery of the conical face 8 by the end 12 of a conveying and rotatable blade arm 14 which is spirally formed against the direction of flow 13, and is mounted on a shaft 15 on the silo axis which may be placed in rotation around the central axis of the silo by a motor and the speed of which may be adjusted. On removal from two parts of grain arranged above each other the diameter of the annular area is advantageously at least equal to half the silo diameter.

The blade arm 14 and its end 12 which may be vertically stepped downwards under certain circumstances consists of a flat sheet blade bent in a spiral and perpendicular to the base 9. On the shaft 15 below the outlet opening 5 is an obturator 16 which is radially adjustable on a radial arm 17 of the shaft 15 below the outlet opening 5 to extend over an annular surface and thus alters the extent of obturation of the obturator 16 to a greater or lesser degree of the passage way through the outlet opening 5 so as thus to enable adjustment of the outgoing amount of oats from the upper layer 4. It is, however, also possible to use an adjusting slide or valve independent of the shaft 15.

In operation, barley is conveyed by blade arm 14 by means of its end 12 which is stepped downwardly to reduce loading or conveying of grain under certain circumstances from the annular zone 10 and from the layer 3 below the cone 8 inwards to a discharge opening 18 leading to the conveyor 7 which mixes with the oats from the upper layer 4 coming from the opening 5 in the desired proportions, this ratio being defined by adjustment of the obturator 16, the speed of rotation of the layer 14 and the height of the stepped arm 12.

The prospects for the proportioning of stresses are definitely better for removal from the concentric annular area than for simple removal from the centre.

Figure 3:
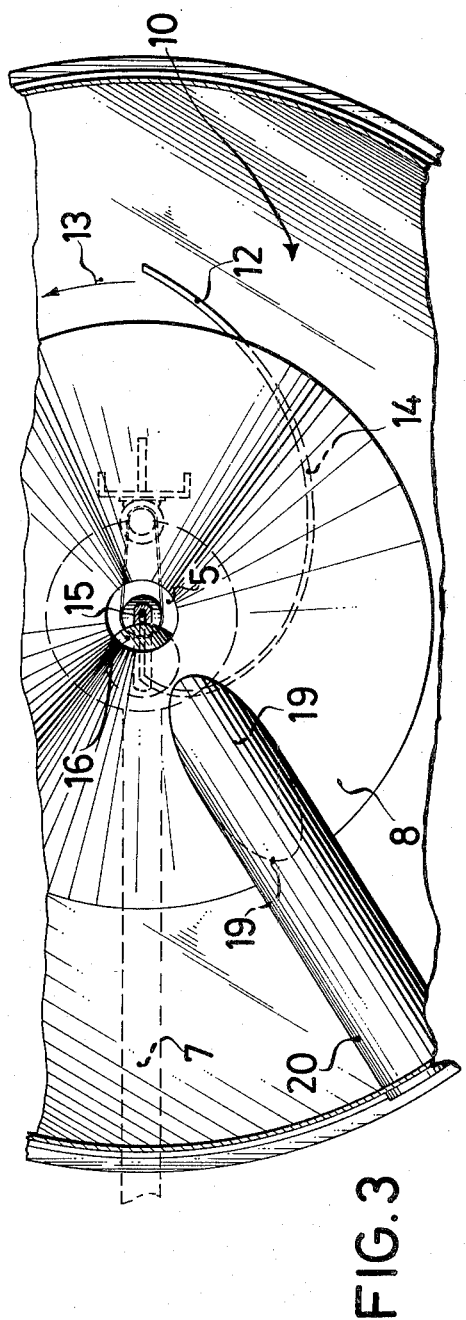
FIG. 3 is a cross-section along the line III—III of FIG. 2.

To be able to control operation of the blade arm 14, 12, its mounting and adjustment of the obturator 16 and to carry out possible repairs, a duct 20 extends from the outer wall of the silo inwardly via an opening 19 in the conical face 8, through which an operator can pass into the area below the face 8 (FIG. 2). A corresponding duct 20 is also used in the embodiment to be described in conjunction with FIG. 3.

Figure 4:
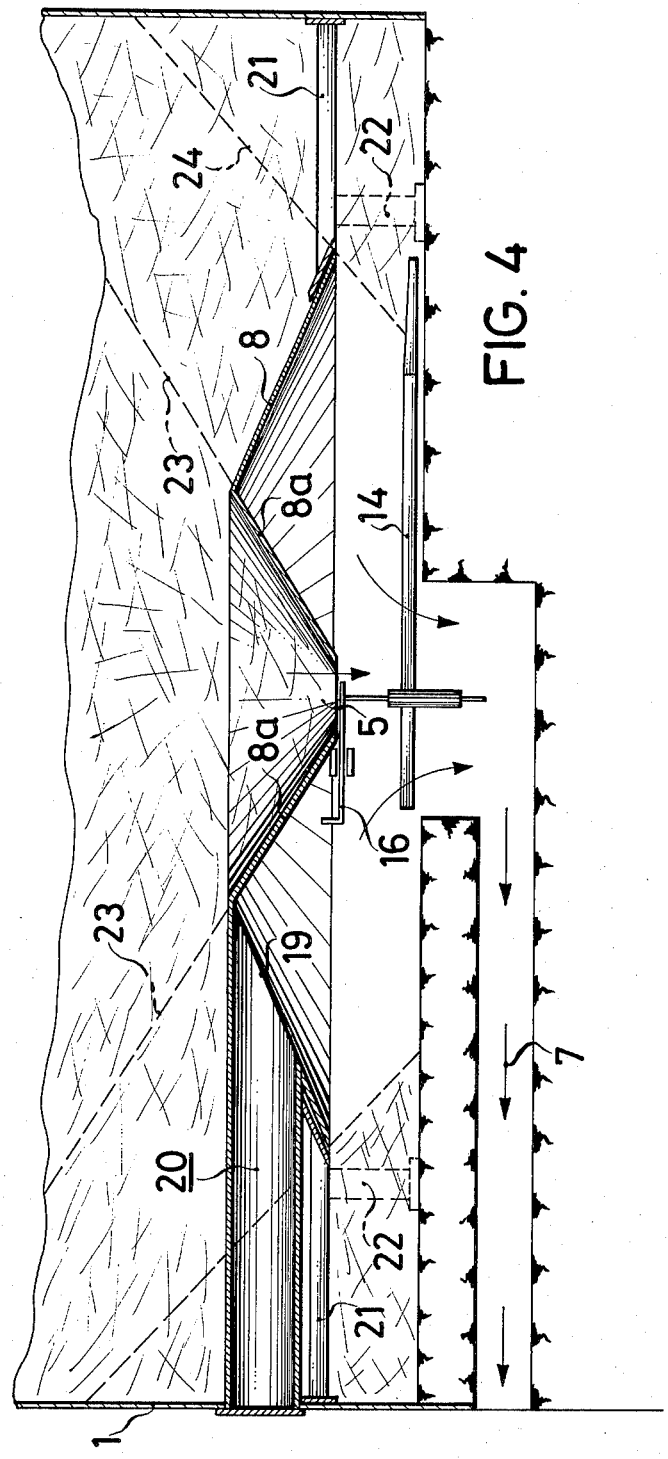
FIG. 4 is a representation corresponding to FIG. 2 but with a different embodiment of device for removal of the grain from the silo.

It is understood that the removal of a mixture of two types of grain from the layers can be maintained for a longer time as the depth of the outlet opening 5 increases. Thus, as will be seen from FIG. 4, from the outlet opening 5 can be formed by the open small conical face of a truncated cone surface 8a with the point directed downwards, which surface is connected to the upper edge of the truncated cone face 8 at the upwardly directed point. The conical surfaces 8 and 8a are supported by radial struts 21 against the inner surface of the silo wall and against the base by vertical struts 22 (shown in dashed lines). As soon as no further grain can run out of the central outlet 5 when the silo is being emptied, a stepping 23 of the grain, indicated by dashed lines, then occurs. It is then conveyed only by the blade arm 14 towards the centre and downward to the conveyor 7. The originally occuring, required mixture ratio can thus no longer be maintained so that a corresponding adjustment of the mixture must occur before or after grinding the grain.

When the remaining grain reaches the slope line 24, the conical surfaces 8, 8a are completely freed from weight i.e. are unloaded, and then the vertical struts 22 can be removed so that it is possible to extend the blade arm 14 until the rest of the grain is removed from the silo.

In practice it may be simple and advantageous, instead of trying to find a suitable adjustment of the outlet opening 5 by the obturator 16 and the thus simultaneous outlet of both layer portions at first to remove the required daily ration of oats for example from the centre and then to remove the amount of barley proportionate thereto from the annular area 10. Both proportions could be fixed according to weight. Mixing is not necessary at this juncture as this is necessary after grinding and by further addition e.g. of protein-rich fodder.

It is also possible to load the silo only with one type of grain and to remove it centrally or annularly.

I claim:

1. In a grain silo of the type including a central bottom outlet opening and conveyor means connected thereto, and wherein the silo is loaded with two layers of different grain kinds, in a predetermined ratio one above the other, and of which the upper layer is taken off centrally by trickling off downwardly through the central bottom outlet opening, the improvement which comprises the central bottom outlet opening of the silo being in the shape of a conical deflector having a truncated conical surface with the point thereof upwardly facing, and an outer peripheral edge disposed at a predetermined distance from the bottom of the silo, the silo being provided at the bottom end thereof with an annular zone defined outwardly by the silo wall and inwardly by said outer peripheral edge of said conical deflector and having a diameter at least equal to half the diameter of the silo, and a rotatable blade mounted in the bottom of the silo beneath said conical deflector for rotation around the central axis of the silo, for conveying grain toward the center of the silo and said conveyor means, said annular zone being partly covered by said blade at said outer peripheral edge of said conical deflector, the free end of said blade engaging a grain slope forming in said annular zone under said outer peripheral edge to convey grain to said conveyor means where such grain is mixed with grain of a different kind taken off the upper layer, so that a desired mixture relation of different grain kinds can be obtained from two unmixed layers of different grain kinds.

2. A silo according to claim 1, wherein said truncated conical surface is connected to a further truncated conical surface with the point thereof downwardly directed and said blade is mounted beneath said truncated conical surfaces.

3. A silo according to claim 2, wherein said truncated conical surfaces are supported by radial struts against an inner peripheral wall of the silo, and by vertical, removable struts against the bottom of the silo.

4. A silo according to claim 1, wherein said rotatable blade is attached to a vertical, central, drivable shaft, is bent spirally in the direction of its rotation and conveys the grain to said conveyor means.

5. A silo according to claim 1 wherein said central outlet opening is coverable to any desired extent by obturator means.

6. A silo according to claim 1, wherein central and annular extraction of grain is simultaneously adjustable.

7. A silo according to claim 1, wherein central and annular extraction of grain is simultaneously adjustable.

8. A silo according to claim 1, wherein said blade is stepped downwardly to reduce conveying of grain from said annular zone toward the center of the silo and downwardly to said conveyor means.

* * * * *